A. B. ELMSTROM & J. A. McDONALD.
CAMERA.
APPLICATION FILED APR. 24, 1915.
1,221,847.
Patented Apr. 10, 1917.
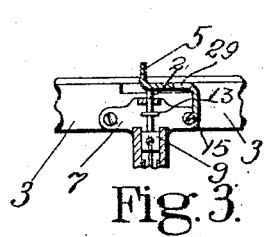
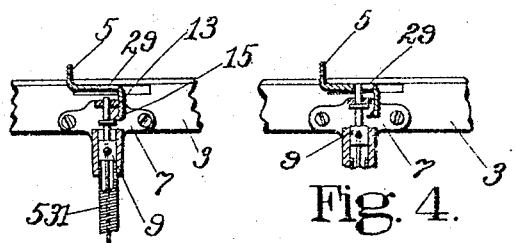
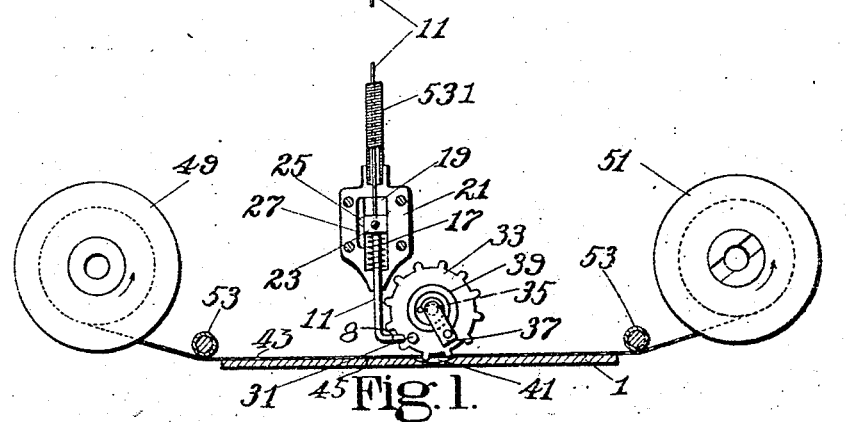
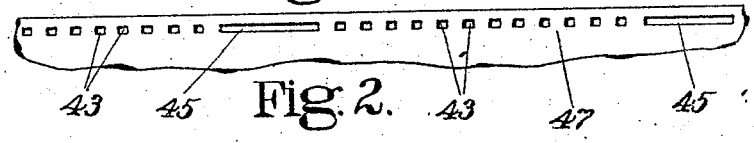
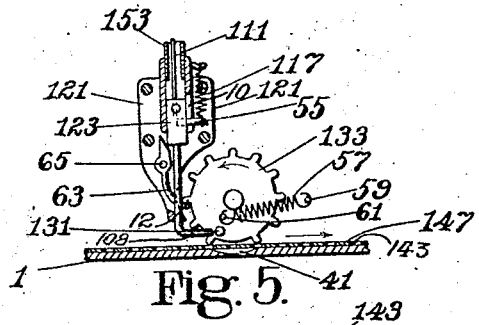
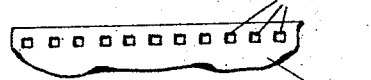
INVENTORS.
Anshelm B. Elmstrom
Joseph A. McDonald
by Fred W. Seybold
their attorney

UNITED STATES PATENT OFFICE.

ANSHELM B. ELMSTROM, OF SWAMPSCOTT, AND JOSEPH A. McDONALD, OF AUBURNDALE, MASSACHUSETTS.

CAMERA.

1,221,847.   Specification of Letters Patent.   Patented Apr. 10, 1917.

Application filed April 24, 1915. Serial No. 23,739.

*To all whom it may concern:*

Be it known that we, ANSHELM B. ELMSTROM and JOSEPH A. McDONALD, citizens of the United States, residing at Swampscott, in the county of Essex, and Auburndale, in the county of Middlesex, State of Massachusetts, respectively, have invented certain Improvements in Cameras, of which the following description, in connection with the accompanying drawings, is a specification, like reference characters on the drawings indicating like parts in the several figures.

This invention relates to cameras and is herein illustrated in connection with a so-called film camera in which the sensitized film proper is carried by a strip of flexible material such as celluloid.

In using a camera it frequently happens that a second exposure of the same sensitized film is accidentally made with the result that the photographic negative produced by the first exposure is spoiled.

The general object of the present invention is to prevent such accidental double exposure by a locking mechanism which prevents a second exposure from being made until the photographic negative produced by the first exposure has been removed from the field of exposure.

Referring to the accompanying drawings,—

Figure 1 is a section of a portion of a camera in which the present invention is embodied;

Fig. 2 is an elevation of a piece of flexible strip of celluloid upon which the sensitized film is mounted, said strip being cut to be operated by the mechanism shown in Fig. 1;

Fig. 3 is a detail showing the relative positions of the member 5 and the locking wire 11 just after the member 5 has been moved to the right to make an exposure;

Fig. 4 is a detail showing the relative positions of the same parts after the member 5 has been moved back into its normal position and is locked to prevent a second exposure;

Fig. 5 is a detail showing a modified form of mechanism;

Fig. 6 is an elevation of a modified form of flexible strip.

Referring first to Figs. 1, 2, 3 and 4, the camera box is indicated at 1, the shutter at 3, and a finger release of simple form at 5. The shutter will not be described further since the details of its construction form no part of the present invention. It will be understood, however, that the finger release 5 is normally held in the position shown in Figs. 1 and 4 by the usual spring and that movement of said finger release to the position shown in Fig. 3 permits light to pass through the lens to the sensitized film to produce the photographic negative.

Fast to the shutter is a bracket 7 having a depending cylindrical portion in which is slidably mounted a collar 9 which is fastened to a wire 11 near the upper end thereof. This wire carries above the collar 9 a smaller collar 13 which normally engages a latch 15 formed on a part of the finger release 5, the wire being urged upwardly at all times by a compression spring 17 the lower end of which bears upon the bottom of a slideway 19 formed in a bracket 21 which is fastened in any suitable manner to the camera box. The upper end of the spring 17 bears on the under side of a collar 23 which is fast to the wire 11; and the collar has a projection 25 which enters a guideway 27 and prevents the wire from twisting. If now the member 5 is moved into the position shown in Fig. 3 to expose the sensitized film, the wire 11 will immediately be pushed up into the position shown in said figure; and when the member 5 is returned by the usual spring to the position shown in Figs. 1 and 4, the wire 11 will be moved farther up until it enters a hole 29 in the member 5 to lock said member, the upward movement of the wire being limited by contact of the collar 13 with a projection of the bracket 7 through which the wire passes.

From the mechanism which has thus far been described it will be clear that when the member 5 has been moved to the right and released in the usual manner to permit light to pass through the lens and thereby to expose the sensitized film and produce a photographic negative, a second movement of the member 5 to the right to produce a second exposure is prevented until the wire 11 has been drawn down. It will also be clear that when said wire is drawn down the collar 13 will snap under the latch 15 and hold the wire in the position shown in Fig.

1 with the parts in position to make a second exposure.

The mechanism by which movement of the photographic negative out of the field of exposure draws down the wire and resets the exposure producing mechanism in the position of parts shown in Fig. 1 will now be described. At the lower end of the wire 11 is a hook 8 which, when the wire is in raised position, extends into the path of a pin 31 on a toothed wheel 33. This wheel is rotatable on a fixed arbor 35 on the end of which is a flat arm or stop 37, said arm being connected with said wheel by a coiled spring 39 so that when the wheel is free to rotate, the pin 31 will be brought into contact with the right-hand side of the arm 37 by said spring. The teeth of the wheel, as it is rotated, run in a groove 41 in the back of the camera box 1 and project through holes 43 or slots 45 in a flexible strip 47 such as celluloid by which the sensitized film is carried, said strip being unwound from the spool 49 and wound on the spool 51 in the usual manner, and being held flat against the back of the camera box in the present case by idle rolls 53. The series of holes 43 are broken at regular intervals by the slots 45, the distance between one slot and the next one being approximately equal to the width of the photographic negative which is to be produced.

With the parts in the position shown a photographic negative has nearly been drawn out of the field of exposure; the spool 51 is still being turned, the pin 31 has drawn down the wire 11, one of the teeth of the wheel 33 has entered a slot 45, and the next tooth to the right is about to leave its hole 43. When the last-named tooth leaves its hole and the slot 45 is drawn a little farther to the right there will be nothing to hold the wheel 33 against the force of the spring 39 which will then act to turn the wheel quickly in a clockwise direction until the pin 31 strikes the arm or stop 37. Everything will then be ready to make an exposure. Pressure upon and release of the member 5 permits the wire to rise, as has been explained, first into the position shown in Fig. 3 and then into the position shown in Fig. 4. The spool is then turned, the rear edge of the slot 45 and then the rear edges of the holes 43 engaging the teeth of the wheel 33 successively to turn it in a counter-clockwise direction against the force of the coiled spring 39. As the wheel turns, the pin 31 strikes the hook and pulls down the wire 11 until the collar 13 snaps under the latch 15. The pin 31 then moves a short distance until another slot 45 is encountered by the teeth of the wheel whereupon the spring 39 once more turns the wheel quickly backward until the pin 31 contacts again with the arm 37.

The wire 11 is shown as surrounded by a casing consisting of a coiled spring 531 the ends of which are fast respectively to the brackets 7 and 21. The spring casing and wire are a convenient form of control, the purpose of the construction in the present case being to provide a flexible connection which may be coiled or bent to permit the camera to be closed.

Referring now to Figs. 5 and 6, the same form of controlling wire 111 is made use of; and this wire at its upper end is constructed exactly as in Fig. 1 and coöperates with the movable member 5 in the same manner. The difference between the two constructions lies in the manner in which the wire 111 is reset in the position shown in Figs. 1 and 5 after an exposure has been made.

The collar 123 fast to the wire slides in a slideway formed in the bracket 121 and is held from turning by a pin 55 which extends through a slot 10 in the wall of said slideway, a spring 117 tending always to urge the pin, and hence the wire 111, upwardly. The coiled spring 153 is similar to the spring 531 of Fig. 1. The parts thus far described are all identical with or similar to the corresponding parts in Fig. 1.

The celluloid strip 147, however, has no slots but merely a row of equally spaced holes 143; and the toothed wheel 133 is mutilated by the removal of one tooth. A tension spring 57 fast at one end to a fixed pin 59 and at the other end to a pin 61 fast to the wheel 133 tends, when the parts are in the position shown, to turn the wheel in the direction indicated by the arrow; and this tendency is resisted by a pawl 63 pivoted at 65 to the bracket 121, said pawl being held in engagement with a tooth 12 on the wheel 133 by the collar 123 which engages the tail of the pawl. The wheel 133 is thus held stationary.

In the position of parts shown the camera is set for an exposure. When such exposure has been made by movement of the member 5 in the manner described, the wire 111 rises and locks the member 5 as shown in Fig. 4. The rise of the wire 111 releases the pawl 63 whereupon the spring 57 turns the wheel 133 until a tooth engages a hole 143. Then, as the operator winds the spool 51, the wheel 133 is turned in the direction indicated by the arrow. A pin 131, which is short enough to pass beneath the spring 57, presently engages the hook 108 on the wire 111 thereby pulling the hook down and resetting the pawl 63. The wheel 133 then comes to rest in the position shown.

The invention has been illustrated in connection with a camera of the so-called film type in which the sensitized film proper is carried by a strip of flexible material such as celluloid; but it will be understood that this has been done for convenience only that the invention is not limited in its broader aspects to any particular type of camera, and that the term "sensitized film" as used throughout the specification and claims refers to the emulsion of silver salts upon which the light acts to produce a photographic negative.

Having thus described our invention, what we claim as new and desire to secure by Letters Patent of the United States is:—

1. The combination with a camera having a member manipulation of which exposes a film, of a mechanism normally set to lock said member after manipulation thereof, a wheel having teeth which enter holes in said film whereby, when said film is wound up, said wheel is turned, and means operated by the turning of said wheel after said member has been locked to free said member and reset said locking mechanism.

2. The combination with a camera having a member manipulation of which exposes a film, of mechanism normally set to lock said member after manipulation thereon and a wheel connected with said locking mechanism and adapted to engage said strip and be turned in one direction when said film is wound up, and a spring for turning said wheel in the opposite direction.

3. The combination with a camera having a member manipulation of which exposes a film, of a rod normally set to lock said member after manipulation thereof, there being a hook on said rod, a wheel having teeth which enter holes in said film whereby when said film is wound up said wheel is turned, and a pin carried by said wheel and arranged to engage said hook and reset said rod.

4. The combination with a camera having a member manipulation of which exposes a film, of a rod normally set to lock said member after manipulation thereof, there being a hook on said rod, a wheel having teeth which enter holes in said film whereby when said film is wound up said wheel is turned, a pin carried by said wheel and arranged to engage said hook and reset said rod and yielding means for returning said wheel to its original position.

In testimony whereof we have signed our names to this specification.

ANSHELM B. ELMSTROM.
JOSEPH A. McDONALD.